(12) United States Patent
Gabriel

(10) Patent No.: US 6,412,731 B1
(45) Date of Patent: Jul. 2, 2002

(54) SIMPLIFIED BUOYANCY SYSTEM FOR AVOIDING AIRCRAFT CRASHES

(76) Inventor: Edwin Zenith Gabriel, 91 Mt Tabor Way, Ocean Grove, NJ (US) 07756

( * ) Notice: Subject to any disclaimer, the term of this patent is extended or adjusted under 35 U.S.C. 154(b) by 0 days.

(21) Appl. No.: 09/583,442

(22) Filed: May 31, 2000

Related U.S. Application Data

(63) Continuation-in-part of application No. 09/514,125, filed on Feb. 28, 2000, now Pat. No. 6,325,328, which is a continuation-in-part of application No. 09/470,737, filed on Dec. 23, 1999, now Pat. No. 6,315,241.

(51) Int. Cl.$^7$ .............................................. B64C 21/02
(52) U.S. Cl. ..................... 244/12.1; 244/23 D; 244/207; 244/12.3
(58) Field of Search ................ 244/5, 97, 98, 244/99; 246/12.1, 12.2, 12.3, 12.4, 12.5, 23 R, 23 B, 23 A, 23 D, 207, 210, 52, 15

(56) References Cited

U.S. PATENT DOCUMENTS

| | | | | |
|---|---|---|---|---|
| 1,604,291 A | * | 10/1926 | Koun | 244/5 |
| 1,818,309 A | * | 8/1931 | De Villard | 244/210 |
| 2,943,822 A | * | 7/1960 | Hamilton | 244/76 J |
| 3,032,298 A | * | 5/1962 | Callahan | 244/5 |
| 3,190,584 A | * | 6/1965 | Gire et al. | 244/52 |
| 3,326,500 A | * | 6/1967 | Lanier | 244/211 |
| 3,559,920 A | * | 2/1971 | Moore | 244/5 |
| 3,907,218 A | * | 9/1975 | Miller | 244/5 |
| 4,451,016 A | * | 5/1984 | Genovese | 244/107 |
| 4,962,903 A | * | 10/1990 | Byron | 244/210 |
| 5,890,676 A | * | 4/1999 | Coleman et al. | 244/97 |
| 6,029,929 A | * | 2/2000 | Blum et al. | 244/2 |

FOREIGN PATENT DOCUMENTS

| | | | | |
|---|---|---|---|---|
| FR | 1051588 | * | 1/1954 | 244/210 |
| FR | 1287372 | * | 2/1962 | 244/52 |
| GB | 610143 | * | 10/1948 | 244/52 |
| GB | 735065 | * | 8/1955 | 244/12.5 |

* cited by examiner

Primary Examiner—Galen L. Barefoot

(57) ABSTRACT

This is an advanced simplified system for avoiding light aircraft crashes, using rate-of-turn sensors, solenoid-operated air valves and electrical circuits with relays. The sensors and air valves provide the needed corrections to an aircraft's pitch and roll angles to prevent it from going out of control. When needed, all valves blast out high velocity air to provide lift, thus preventing the aircraft from crashing upon landing. The system does not require air compressors and air tanks. In this simplified system, the inlets of the valves receive high velocity air from the aircraft's flight motion through the atmosphere. The more air valves installed on the wings of the aircraft the more lift produced. This system can continue to provide the needed lift and altitude corrections while the aircraft is in flight, the faster the flight, the greater the system's ability to make corrections, when needed, to avoid an aircraft crash. A single air tank connected to each wing's air valves can provide high pressure air to such additional valves to furnish needed lift when the aircraft's forward velocity slackens to a slower than a predetermined value, thus ensuring that sufficient force to lift a wing is forth-coming. To assist the air valves in providing for retardation of aircraft's falling speed, 4 large umbrella-shaped parachutes have been added.

10 Claims, 13 Drawing Sheets

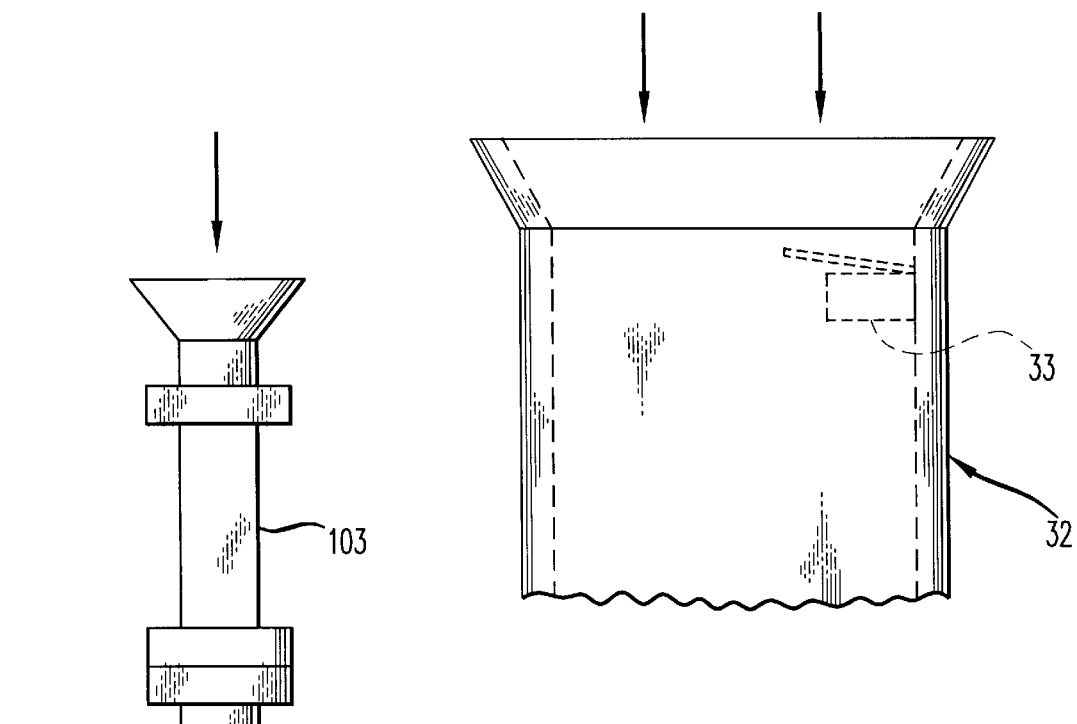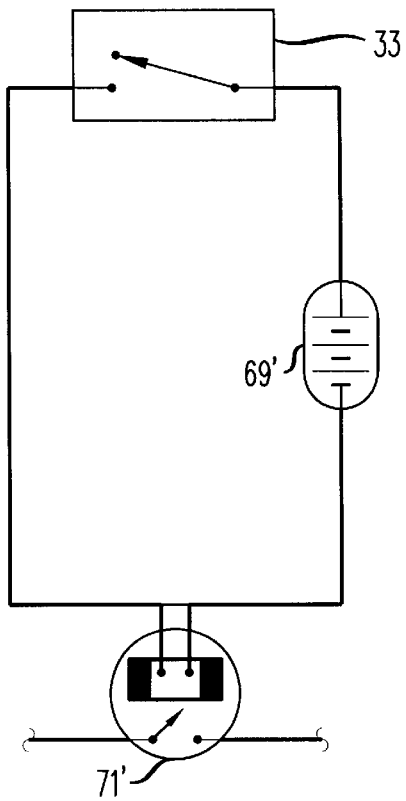
*FIG. 4A*
*FIG. 4B*
*FIG. 4*

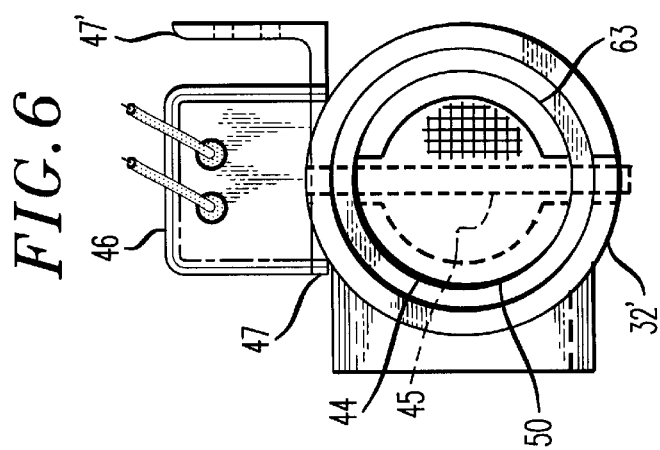
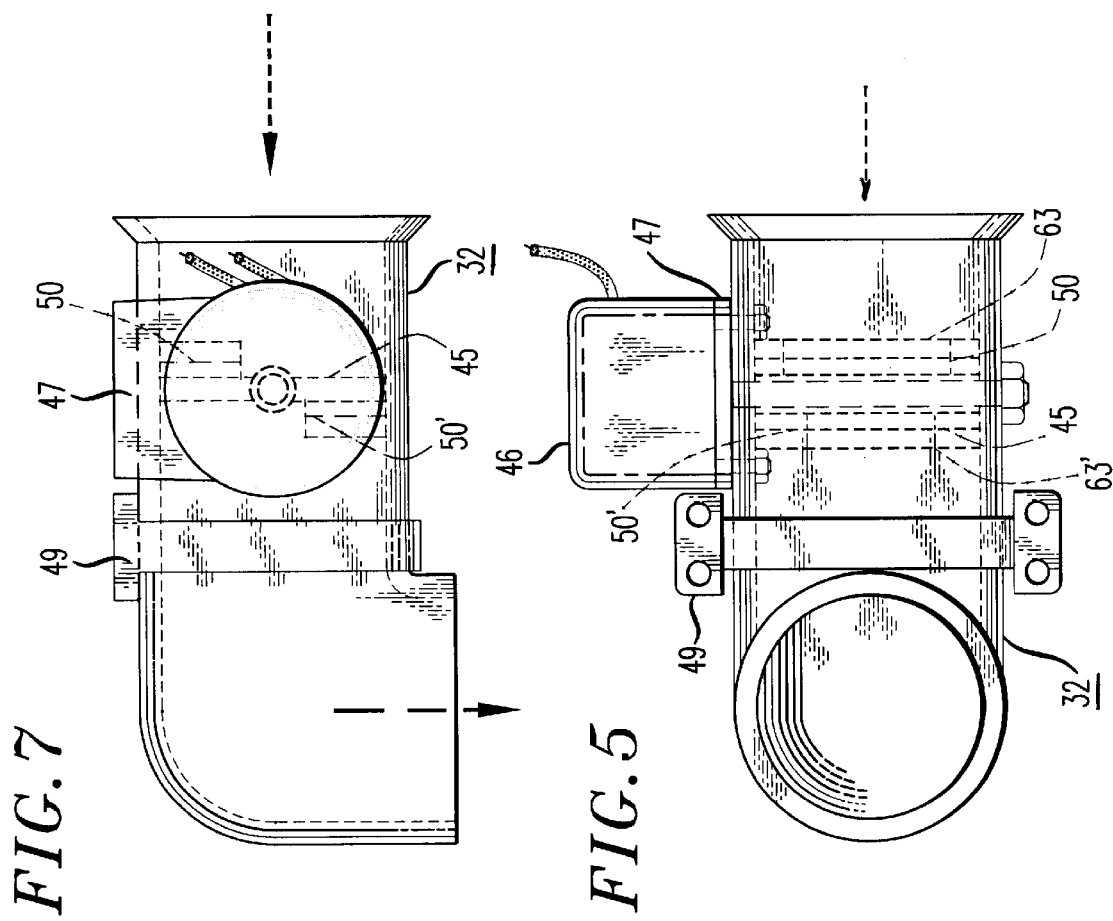

WEIGHT: 2450 lbs., TAKEOFF
OVERALL HEIGHT, 8'-11"
WING SPAN 36'-1"
WIDTH, CABIN 39.5"
OVERALL LENGTH 26'-11"

CESSNA 172

SIMPLIFIED BUOYANCY SYSTEM FOR AVOIDING AIRCRAFT CRASHES

This system is a continuation-in-part of a patent application, Ser. No. 09/514,125, filed Feb. 28, 2000, now U.S. Pat. No. 6,325,328 which is a continuation-in-part of patent application Ser. No. 09/470,737, filed Dec. 23, 1999 now U.S. Pat. No. 6,315,241. The pending application included a compressor to replenish air in a high pressure tank when air in the tank depletes and air pressure in the tank fails. This system eliminates the compressor. None of the work of this invention was performed under any Federally-Sponsored or State-Sponsored research and development. Gabriel used his own resources on every phase of this project.

BACKGROUND OF THE INVENTION

1. Field of the Invention

This invention is in the field of aircraft safety in flight, wherein even if the pilot were to make an error, the system will attempt to make the desired corrections to avoid and prevent the aircraft from going out of control and crashing. This disclosure with illustrations describes how the system functions to prevent an aircraft crash, by continually making any corrections to the aircraft's malfunctioning control system to keep the aircraft aloft, until it can be safely landed.

2. Description of Prior Art

The inventor is aware only of his own US patent applications. The serial numbers of his applications are: Ser. No. 09/514,125 filed Feb. 28, 2000; Ser. No. 09/366,263, filed Aug. 02, 1999; and U.S. Pat. No. 6,315,241B1.

SUMMARY OF THE APPLICATION

This is a novel technique for helping prevent a lightweight aircraft from crashing should the aircraft experience engine or mechanical control problems. Air valves, through which air blasts out, are judiciously placed on the belly and wings of the aircraft, zoned to operate and make the desired corrections whenever either the aircraft's pitch angle or roll angle becomes excessive. The previous patent application, filed Feb. 28, 2000, included an air compressor to replenish the air in the air tank, when the high pressure air is blasting out through the valvel's outlet. In this application, a compressor is unnecessary for supplying compressed air to two or more tanks whenever a tank's air pressure is reduced.

This application reinforces and enhances the safety features of the aircraft lifting system for aircraft described in U.S. Pat. No. 6,315,241B1, dated Nov. 13, 2001.

BRIEF DESCRIPTION OF DRAWINGS

For the purpose of illustrating the control system for preventing light aircraft crashes, the following drawings show forms which are preferred. It is to be understood that this invention is not necessarily limited to the precise arrangement, instrumentalities and field of utility as therein demonstrated.

FIG. 4 shows a velocity-to-voltage transducer with its voltage output connected to a second relay of FIG. 3A; this second relay closes when the air pressure and air flow through the out-board air valves falls below a predetermined value.

FIG. 4A is an alternate technique for activating this second relay, in which a Micro-Switch is installed in the air inlet of an air valve to sense air pressure. The microswitch closes the circuit when the air pressure exceeds a predetermined value.

FIG. 4B is the circuit with the Micro-Switch in the loop.

FIG. 5 is a bottom view of a butterfly air valve as it is mounted on the aircraft's belly. A circular outlet port is shown.

FIG. 6 is a side view of the valve, showing the butterfly valve disc and the solenoid with elongated shaft to rotate the disc 90°, when activated.

FIG. 7 shows the valve's top view with arrows showing air entering and discharging from the elbow-shaped valve.

A PREFERRED EMBODIMENT

Figure 1:
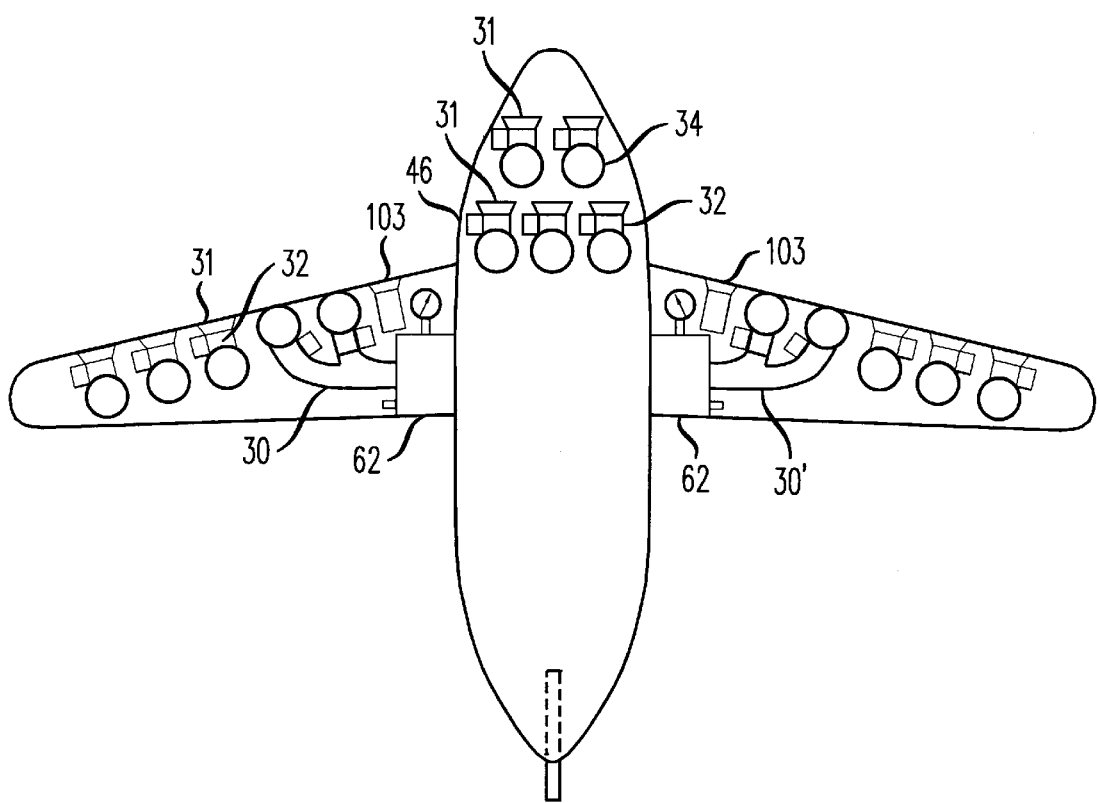
FIG. 1 shows the belly or underside of a fixed wing aircraft, with duct work to two in-board solenoid air valves, on each wing for roll angle correction and three additional on each wing without ducts for the out-board air valve for roll angle correction. During flight air enters the valve inlet ports and discharges at the outlet ports of the valves to provide lifting. An air cylinder is shown for providing air for the two in-board roll angle correction valves with connecting ducts. Five additional air valves are shown near the nose for pitch angle correction of the aircraft.

As an introduction to FIG. 1, showing the belly or underside of a fixed-wing aircraft with solenoid-operated air valves or air valves with a solenoid operator and two high-air-pressure tanks, an explanation is provided as to why this design is preferred. It is desired to have an adequate surface control system that does not rely on the aircraft's existing control system and not even on its electrical or hydraulic power for operation. All that is needed to operate the signals, relays, sensors, solenoids are batteries, in order to be entirely independent, in case of power failure. The batteries could be recharged with solar cells, placed on the wings of the aircraft. Alternatively, the aircraft's auxiliary power could be used, when properly functioning.

Figure 2:
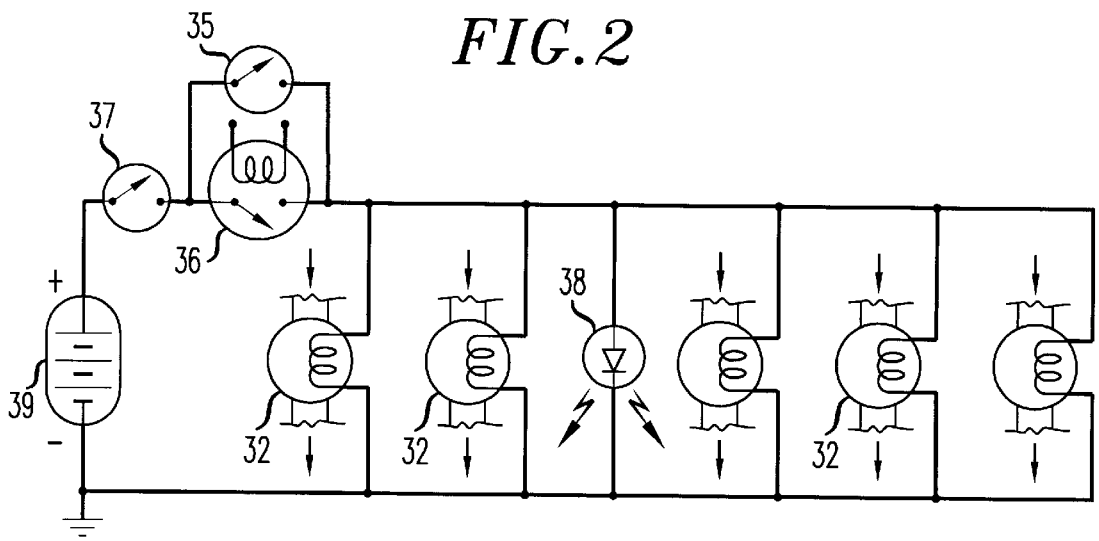
FIG. 2 is a schematic wiring diagram for activating the solenoid valves for the aircraft's pitch axis. They would be activated by the altimeter sensor or by a rate-of-turn sensor, to avoid an aircraft crash.

In FIG. 1, three independent air lifting systems are shown, the five air valves 32 at the nose portion, two sets of three air valves 32, each set of three located at the extreme ends of the two wings, and two sets of two air valves 32 with ductwork so connected to an air tank 62, one set on each wing, located close to the fuselage. The design of the air valve is shown in FIGS. 5 to 7. Additional air valves could be added to provide additional buoyancy. For providing lift to the nose of the aircraft, the five air valves 32 with inlets 31 and outlets 34 are shown. FIG. 2 is the circuit needed to operate these valves, when lift is needed for the aircraft pitch axis. For providing lift to either wing of the aircraft, a set of three out-board air valves 32 are provided on each wing and a set of two air valves receiving their air, via ductwork 30 and 30' from tanks 62 and 62' are provided, on each wing near the fuselage.

Figure 3:
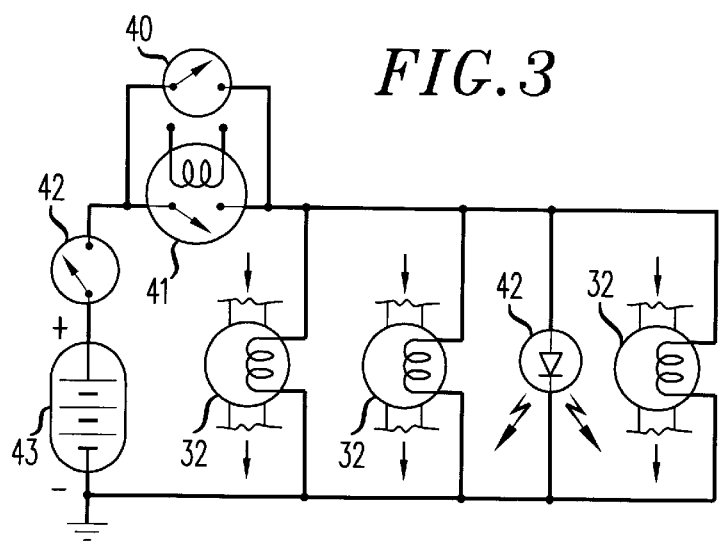
FIG. 3 is a typical schematic wiring diagram for activating the three out-board solenoid valves on the aircraft wing for making corrections to the angle of roll, while the aircraft is in flight. This diagram is the same for the three outboard valves on either wing.

FIG. 3 is the circuit needed to operate the three outboard valves, when roll-axis lift is required.

Figure 3A:
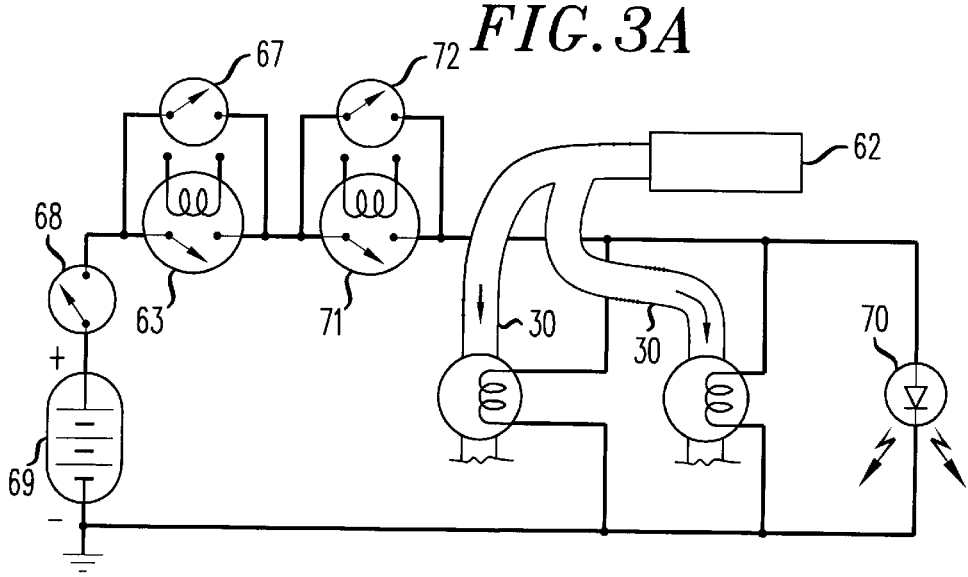
FIG. 3A is a circuit diagram for the two in-board solenoid air valves receiving air from a cylinder.

The two air valves receiving air from tank 62, operate only, when required, when the aircraft's forward motion is below a predetermined magnitude of velocity, such as when the aircraft takes off or when it lands. When the aircraft is flying at slow speed, the independent outboard air valves do not provide sufficient lift, the reason for having the two air tanks. For an aircraft, it is important that this flight control system have low weight and require minimum energy to operate. FIG. 3A is the circuit needed to operate these two in-board valves, when roll-axis lift is needed.

When the aircraft is experiencing trouble and nose-diving, all of the valves on the wings and near the nose of the aircraft could be made to operate to provide sufficient lift to the entire aircraft to permit a soft landing.

In FIG. 1, the air valves configuration on the right wing is a duplication of the air valve configuration on the left wing. Hence, the same circuit diagrams shown in FIGS. 11 and 11A would apply.

FIG. 2 shows the circuit for the pitch axis or nose control of the aircraft, showing the 5 solenoid-controlled valves 32, connected in parallel with each other. Manual switch 37 would be normally closed and switch 35 normally open. Battery 39 supplies voltage to the five solenoids. The circuit is closed when relay 36 is energized by the aircraft's roll angle sensor, such as a gyro. Light-emitting diode 38, located in the cockpit's instrument panel, indicates to the pilot that the pitch-axis air valves are blasting out air at outlets 31, when lit.

FIG. 3A is the circuit for the two air valves receiving air from tank 62 via ducts 30. The two valves' solenoids are connected in parallel. Manual valve 62' would be closed when the aircraft is not in use, to avoid air leakage through valves 32. Relay 63 receives a signal to close from a roll angle sensor. Relay 71 receives its signal from an air velocity-to-voltage transducer 103, such as Ashcroft Model No. ASH-K1-100-7-M02-42-C1, when the air velocity is below a predetermined value, FIG. 12, or from a normally closed Honeywell Micro Switch, such as 6115-311SM23-T, FIG. 4A. When the air velocity is low, then Micro Switch 33 opens causing relay 71 to close. Relay 71 is designed to close on low voltage. Thus, for valves 32, FIG. 3A, to blast out air, both relays 63 and 71 must close. LED 70 tells the pilot, when lit, that these two valves are blasting out air. The right wing valve circuitry is a duplicate of FIG. 3A, and the valves operate in the same manner as described above. FIG. 4 shows a diagram of the transducer 103, mounted under the wing of the aircraft. FIG. 4 shows the output of transducer 103 connected to relay 71. An alternate technique and circuit for accomplishing the same operation as in FIG. 4 is shown in FIGS. 4A and 4B. A small, sensitive Micro Switch 33 by Honeywell is mounted at the inlet of a solenoid air valve 32, requiring as little as an ounce of air pressure to close, for closing the circuit shown in FIG. 4B. FIG. 4B shows switch 33 connected in series with voltage supply 69' and coil of normally-open relay 71. When atmospheric air pressure falls below a predetermined value, switch 33, FIG. 4A, opens, causing relay 71 to close; the circuit is shown in FIG. 3B.

ANOTHER PREFERRED EMBODIMENT

Figure 8:
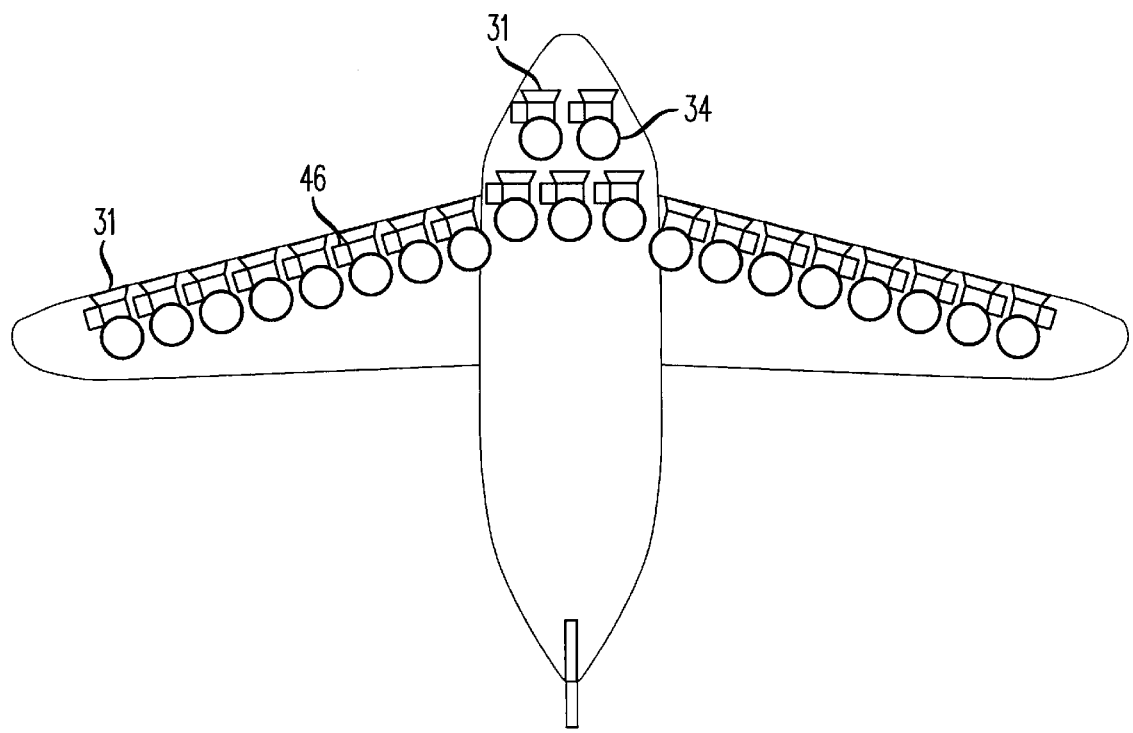
FIG. 8 shows the belly of a single-engine aircraft with 8 butterfly valves mounted on each wing and 5 underneath the nose. Additional valves could be added to provide the needed lift, to avoid an aircraft crash.

In this design of an aircraft crash avoidance system, no high pressure air tanks are used and only air received from the atmosphere enter air valves mounted on the belly and underneath the wings of the aircraft. This simplified design provides less maintenance, less added weight, and a simplified less costly installation. In FIG. 8, 8 valves are shown mounted on the belly of each wing. More valves could be used for additional lift on each wing, depending on the aircraft's weight. Air valves 32 receive high pressure, high velocity air from the aircraft's speed of travel through the air. Simple butterfly solenoid-operated air valves, each one detailed in FIGS. 5 to 7, provide the needed lift, when required, for each wing. Each valve 32 is of a size sufficient to supply the desired quantity of air, such as a valve body diameter of 4 inches. Inlet 31 of each valve would have a screen to keep out insects and other objects. Just a small portion of the screen is shown in FIG. 6, in order not to clutter up the drawing and to indicate its presence. In addition to the valves on the aircraft's wings, with their air outlet ports 34 facing vertically downward, five valves are shown mounted underneath the aircraft's nose to provide lift to its nose, when needed. FIGS. 5–7 are described below.

FIG. 5 shows a detailed bottom view of air valve 32 located underneath aircraft, FIGS. 1 and 8. Valve 32 would be fastened to the aircraft's frame by bracket 49. Rotary solenoid 46 would have elongated shaft 45, and would be fastened to the body of valve 32 with the aid of bracket 47. Its end 47', too, could be fastened to the aircraft's frame, should additional valve support be needed. Disc 44, FIG. 6, has rubber material, semi-circular collar stops, 50 and 50' that also help make the closure of disc 44 air-tight. Rubber collar stops 50 and 50' are held in position by rubber cement and by metal semi-circular collars 63 and 63'. Collars 63 and 63' are rigidly fastened to the valve enclosure's interior by screws or by other means. FIG. 6 shows an end view of valve 32, showing metal collar 63, disc 44 and portion of the screen to keep out insects and birds. Also shown is rubber stop 50'. FIG. 7 shows a side view of valve 32, showing rubber collars 50 and 50' in dashed lines, solenoid 46, brackets 47 and 49 and the direction of the air flow.

Figures 9, 9A, 9B:
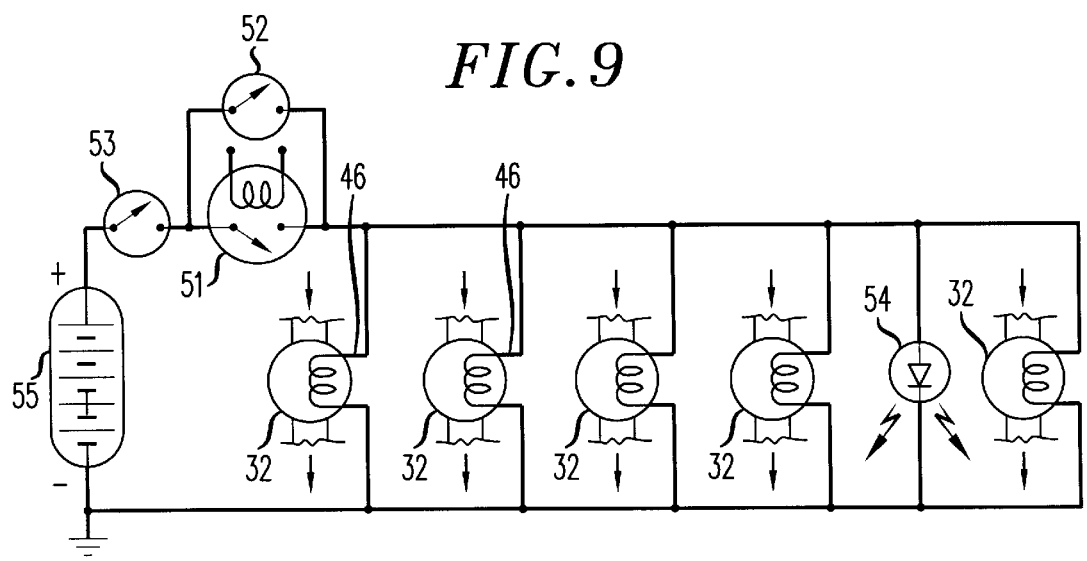
FIG. 9 is a schematic wiring diagram for FIG. 16, for activating the solenoid valves of a typical aircraft roll axis in order to make needed corrections to the angle of roll. The diagram is the same for either right or left wing valves of the aircraft. Both wing's valves would be activated for providing a soft landing for the aircraft.
FIG. 9A shows a portion of FIG. 9, that includes the relay and its bypass manual switch, for both wings of the aircraft, plus including the equivalent relay for the pitch axis circuit. A four-pole, single-throw manual switch is provided to close all three circuits simultaneously to give the desired lift to the entire aircraft.
FIG. 9B shows a portion of FIG. 9 depicting the relay and its bypass manual switch. Equivalent circuit portions are shown for both left and right wings of the aircraft. Thus, if lift for most of the entire aircraft is needed both manual switches would be closed simultaneously.

The operation of the nose valves is provided by the circuit shown in FIG. 2. The pitch axis sensor, such as a gyro, would activate the nose valves when the aircraft's pitch axis exceeds a predetermined value or magnitude. For the valves mounted on the wings, the circuit of FIG. 9 would be applicable for each of the two wings. FIG. 9 shows the circuit for controlling and providing lift for one of the aircraft's roll axes, either left or right wing. In the circuit, five air valves are shown, but there could be eight or more, as shown in FIG. 8, to provide the desired lift to the wing needing correction. Activation of the electric circuit is accomplished by a conditioned signal from a roll angle sensor whenever the roll angle about the fuselage is excessive to activate relay 51, FIG. 9, when the roll angle is corrected to a predetermined, pre-selected value, relay 51 is deactivated. Relay 51 is in series with parallel-connected solenoids 46 of valves 32, so when relay 51 is closed by the roll angle sensor signal, all solenoids 46 are energized by power supply 55. Manual switch 53 enables the pilot to open this roll axis circuit to make it non-functional. Manual switch 52, across relay 51, allows the pilot to activate this roll axis circuit, when relay 51 should fail to operate. Power Supply 55 needs to have the voltage and current capacity to activate all of the solenoids connected in parallel. LED 54, located in the cockpit signals to the pilot which of the two roll axes correction of the aircraft has been activated, by its color and the caption under the LED.

When lift is required for the entire aircraft to enable the aircraft to make a soft landing, then the air valves of both left and right wings can be activated, via the circuit shown in FIG. 9B. Switch 61, a triple-pole, single-throw switch, is added to short-circuit relays 51 and 51' simultaneously and cause all air valves of the aircraft wings, FIG. 8, to activate and blast out air for an aircraft in flight. Should additional lift be required to enable the aircraft to make a soft landing, switch 61', FIG. 9A, is added to short circuit relays 51, 51' and 36. Switch 61' is a quadruple-pole, single-throw switch. Relay 36, FIG. 2, when closed, closes the circuit for the five nose-mounted air-valve solenoids, where shown in FIG. 8. Consequently, closing the 4PST Switch 61' enables all air valves, shown in FIG. 8, to blast out high velocity air, when the aircraft is in flight.

If the above valves do not provide sufficient lift to an aircraft of X pounds of weight, then one could consider mounting 4 parachutes at selected points of the aircraft, such as at the two tips of its wings, the nose and the tail end. For additional lift, one would pull the "rip cords" of all four parachutes simultaneously, to provide the additional needed lift when the aircraft is descending too fast.

ANOTHER TYPE OF SOLENOID-OPERATED AIR VALVE

Figure 10:
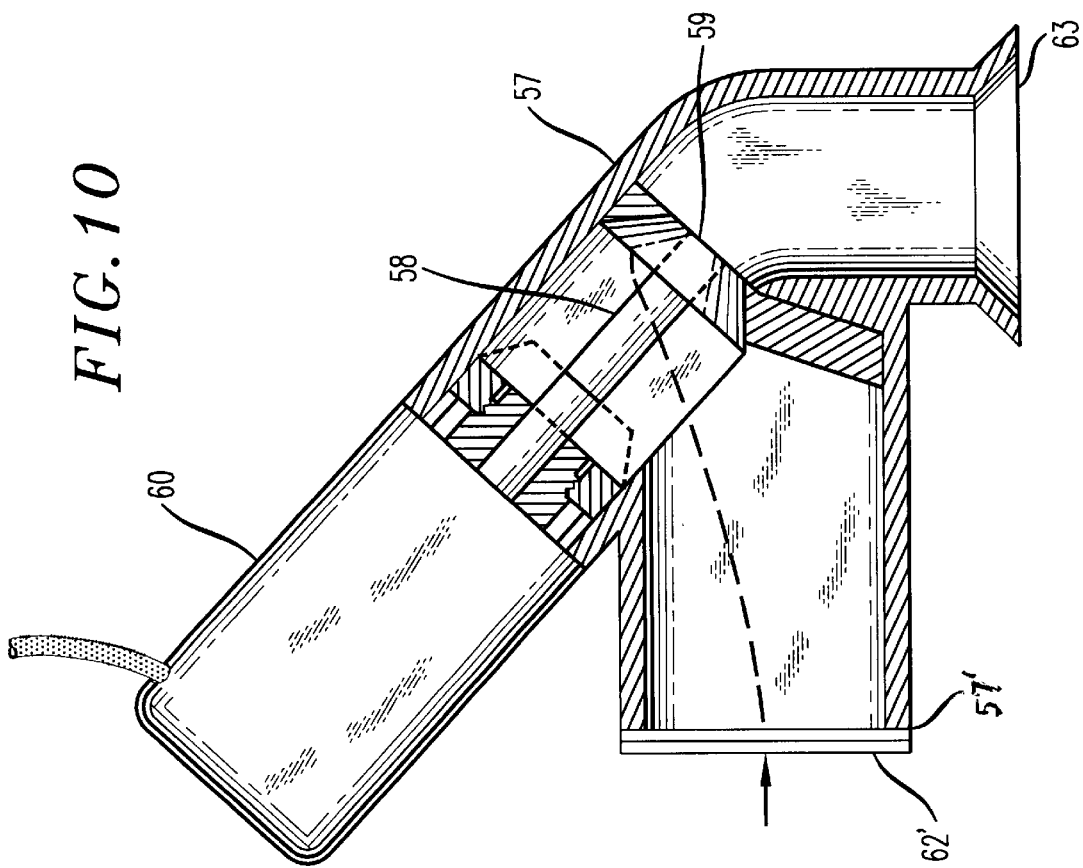
FIG. 10 is a section across line 10—10 of FIG. 11, showing an elbow-shaped, solenoid-operated valve, with a plunger type shaft. The valve's cage also is Y-shaped to permit a stream-lined flow of air.
Figure 11:
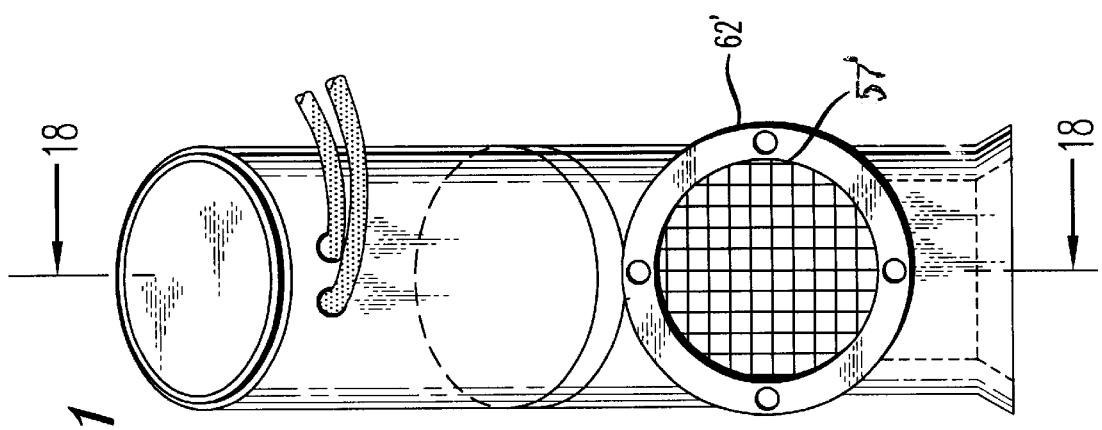
FIG. 11 is a side view of the solenoid-operated valve, shown in FIG. 10.

For a more sturdy air valve, the Y-type, cage-guided air valve 57 shown in FIGS. 10 and 11 is provided. In this design less air leakage would occur for high pressure air pushing against tapered plunger 59, with the valve in its closed position, as shown. When a voltage is applied to tubular solenoid 60, shaft 58 retracts, moving plunger 59 to the position shown in dashed lines. Then air is free to flow from inlet 62 through the valve cage and out through outlet port 63. The valve body would be oriented on the aircraft as shown in FIG. 11. The bracket for mounting this air valve on the wing or nose of the aircraft has not been shown, as it would be complicated and interfere pictorially with the valve's functional understanding. Solenoid 60 could be a LEDEX pull type, tubular, linear solenoid, such as size 175, with a stroke of 1.5 inches or more, and a pull force of 5 lbs. approximately. FIG. 11 shows a front view of the valve and its inlet screen 57'. Screen 57' is shown to keep out insects and foreign objects from entering and interfering with the flow or air and is held in place by ring cover 62'. FIG. 10 is a sectional view along line 10—10 of FIG. 11. Valve 57 closes by the plunger's spring-action when voltage to solenoid 60 is switched off. Using the configuration of air valves in FIG. 8, it may be possible for the pilot of the aircraft to save aviation fuel on take-off from the runway, with all air valves open, as additional lift would be provided for the aircraft.

STILL ANOTHER PREFERRED EMBODIMENT

Figure 12:
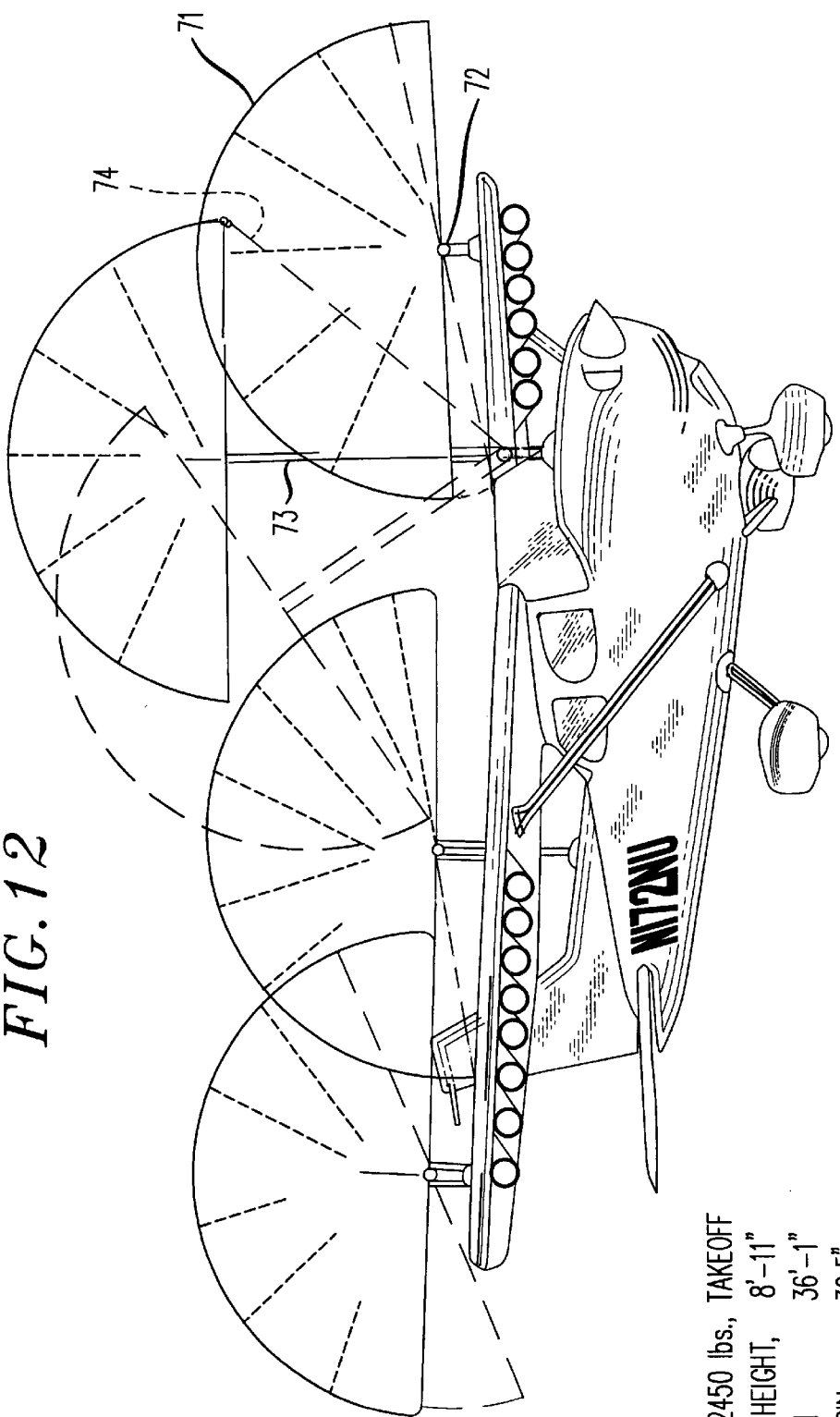
FIG. 12 shows an aircraft with four opened umbrellas, as well as the inlets to the air valves 32, mounted on its two wings. The umbrella posts are capable of tilting backward in the wind when in flight.
Figure 13:
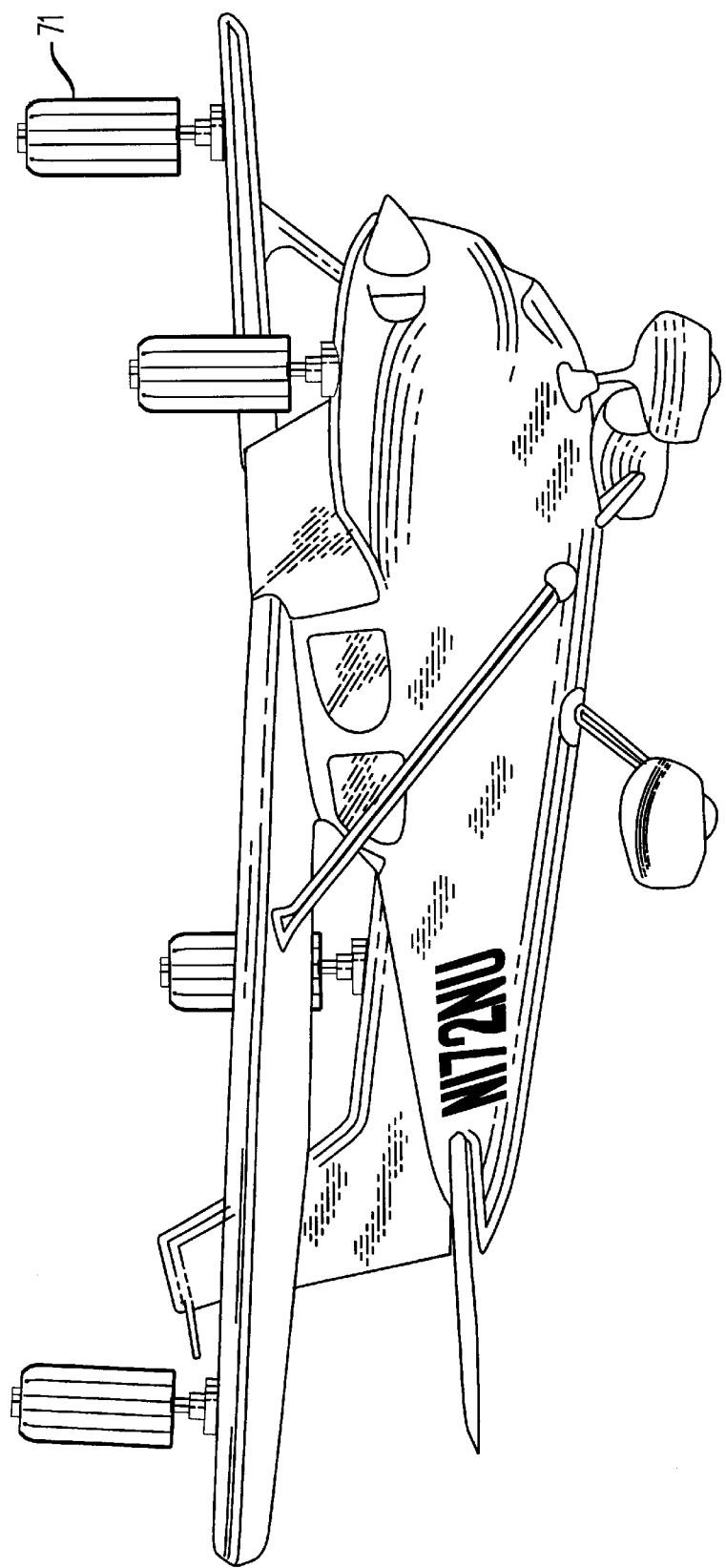
FIG. 13 shows the same aircraft as in FIG. 20, with the four umbrellas folded or closed. For a slow flying single-engine aircraft, the four folded umbrellas would not present much resistance to wind velocity.

To ensure that sufficient lift exists to avoid the crash of a lightweight aircraft, should the air valves produce insufficient buoyancy, large, lightweight umbrellas are provided, acting as parachutes to help provide a soft landing of the aircraft, shown in FIG. 12. The four umbrellas shown in FIG. 12 are normally in a closed position, as shown in FIG. 13, with their telescoping posts collapsed, in order to take less space and have less protrusion above the wings and fuselage of said aircraft. The open umbrellas are shown vertical, but have pivots at location 72, to allow each umbrella to move backward, as shown in dashed lines, to help reduce excessive strain on its lower post 73 as well as on ribs 81, 82 and 83 holding the umbrella in its open position. Strong twine, attached to ribs 85, FIG. 14, and bottom of post 73, prevent umbrella ribs 85 to bend backwards more in the wind. When desired, an umbrella may be removed by removing pivot bolt 72. Post 73 sits inside of hollow cylindrical support 75, having a flat cylindrical base plate with holes for attachment to the aircraft's frame. Support 75 has a slot on top to allow post 73 to swing.

Figure 14:
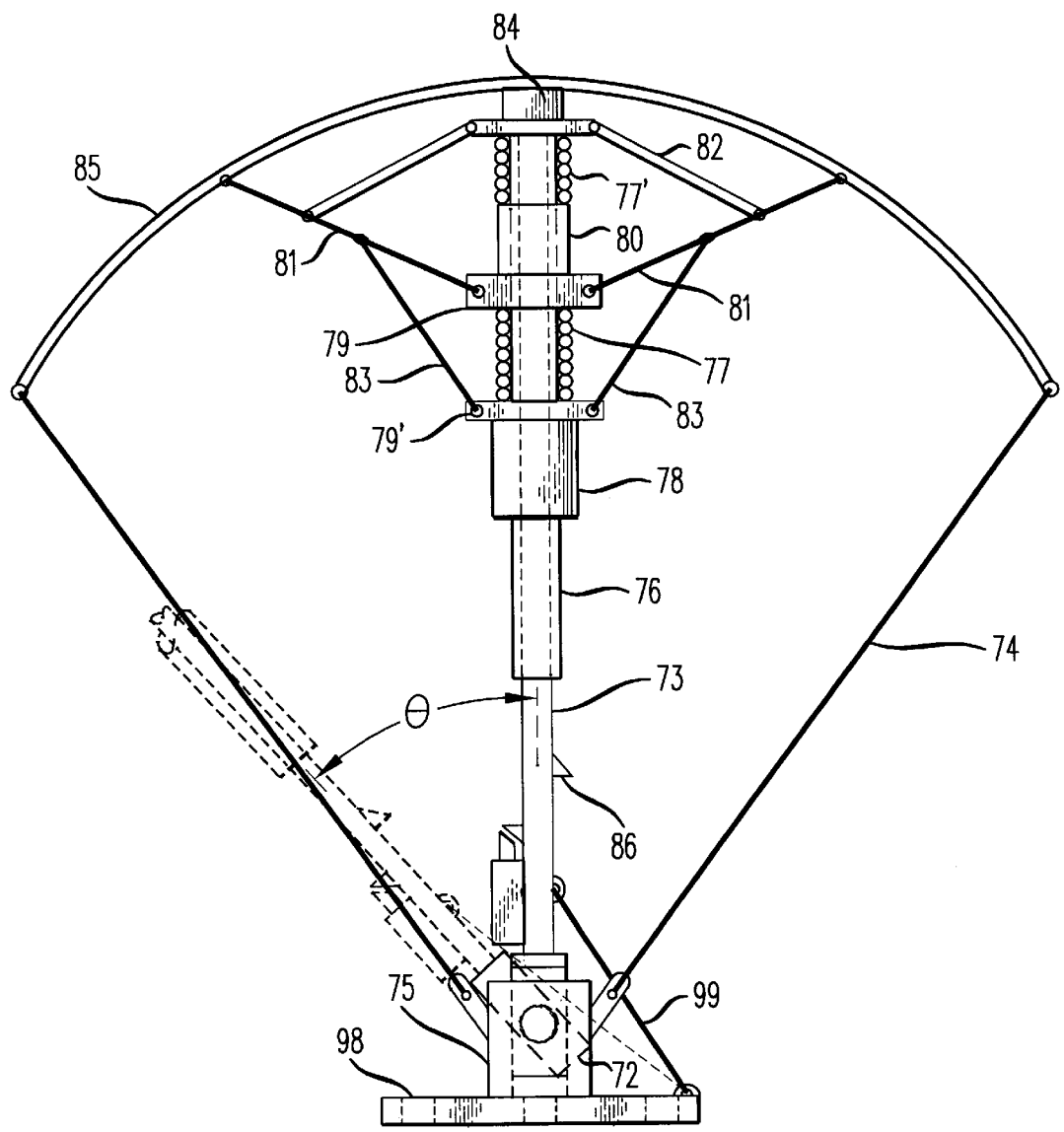
FIG. 14 shows an umbrella in its opened position. The posts shown in dashed lines shows that the umbrella is capable of tilting backward an angle 8 in the direction of the wind. The hollow tubular posts are shown capable of telescoping when wanting to close the umbrella. The lower post's base support is designed with a slot to permit the post to tilt backward.

A detail drawing of the umbrella folding mechanism is shown in FIG. 14. Telescoping hollow tube or post 76 slides over hollow post or tube 73. When closing umbrella, tube 76 slides over spring-protruded catch, and collar 78 slides over tube 76. Collar 78 has an internal recess sliding over catch 86 to keep umbrella in a closed position. Coiled Spring 77, between Collars 78 and 80, compresses when umbrella is closed, to enable the umbrella to open automatically when catch 86 is remotely depressed by linear solenoid 87, shown in more detail in FIG. 16, side sectional view, and in FIG. 15, top view, of mechanism. Latch 86 protruding through slot in tubular post 73, is depressed when outer telescoping tube 76 is pulled down manually by Collar 78. When Collar 78 with internal recess rides over Catch 86, first it depresses it, then the recess allows the catch to project through its slot again. At the same time the opposite end of pivoted lever 88, with right angle bend 91, projects through another slot in tube 73. Projected end of lever 91, when pushed inward by solenoid plunger, causes Catch 86 to recess into tube 73, allowing the umbrella to open; and provide lift to the aircraft. All four umbrellas symmetrically placed atop aircraft, need to open simultaneously to provide the needed lift. Circuit diagram, FIG. 17, is provided to perform the function via manual switch 94.

In addition to collar 78 riding over tubular member 76, FIG. 14, another collar, above collar 78, also rides over member 76, FIG. 14. Collar 80 with flange 79 has as many as eight pivoted spokes attached to it, while Collar 78 has as many wires 83 running from its flange 79' to spokes 81, and pivoting thereto. Spokes 81 extend to outer ribs 85 and are pivoted thereto. In addition, spokes 82 are pivoted both to cap 84, with 8 slots atop the umbrella, and to spokes 81 midway. Another lighter tension coil spring 77' exists between upper collar 80 and bottom of cap 84. The spokes, ribs and wire, described above, are needed to provide the desired shape for the canopy or fabric attached to outer ribs 85 of the umbrella, as well as providing strength to its framework.

Figure 15:
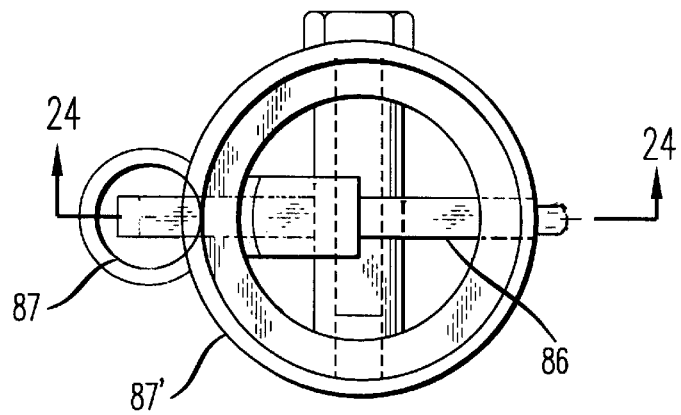
FIG. 15 is a top end view of the lower post to show the lever mechanism for catching the lower flanged collar, when the umbrella is in a closed position. A plunger-type, linear, tubular solenoid, attached to the post, extends its plunger to enable the umbrella to open automatically, by pushing its plunger against the lower end of the pivoted lever with its catch on top.
Figure 16:
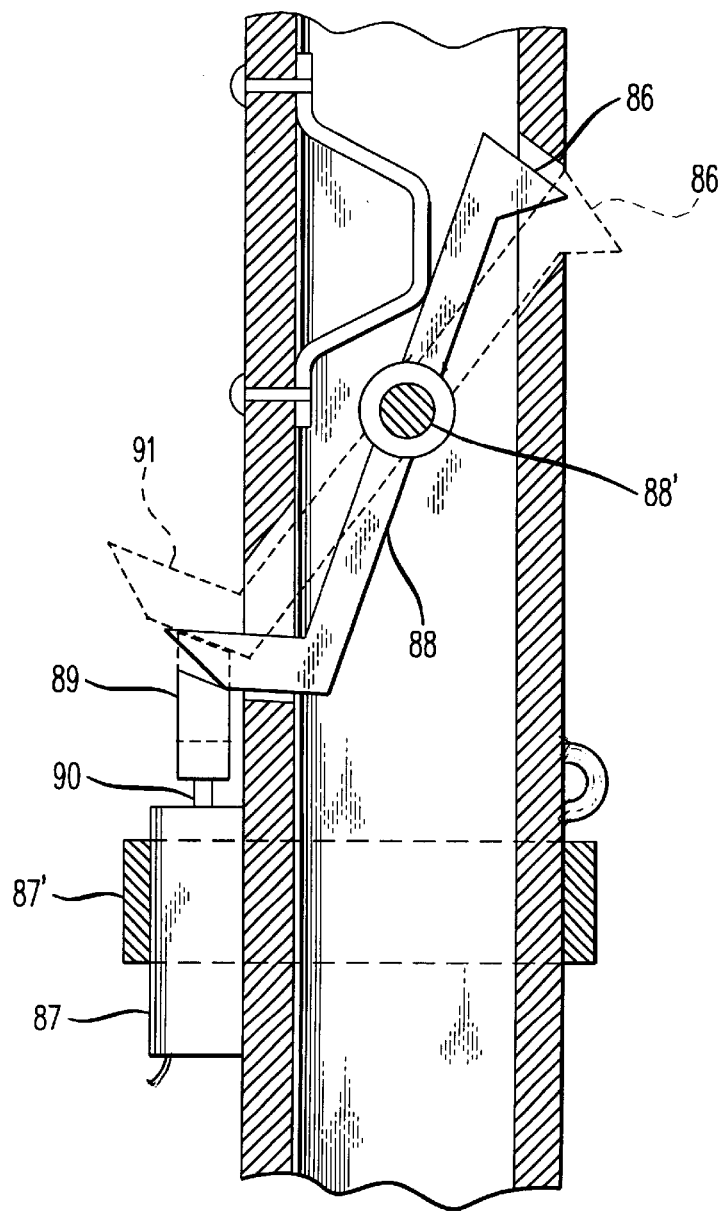
FIG. 16 shows a side elevation section of the same post along line 16—16 of FIG. 15. This sectional view shows the pivoted lever and its catch, part at the upper end very clearly. A flat deflated spring helps to push the lever forward when plunger of solenoid retracts.
Figure 17:
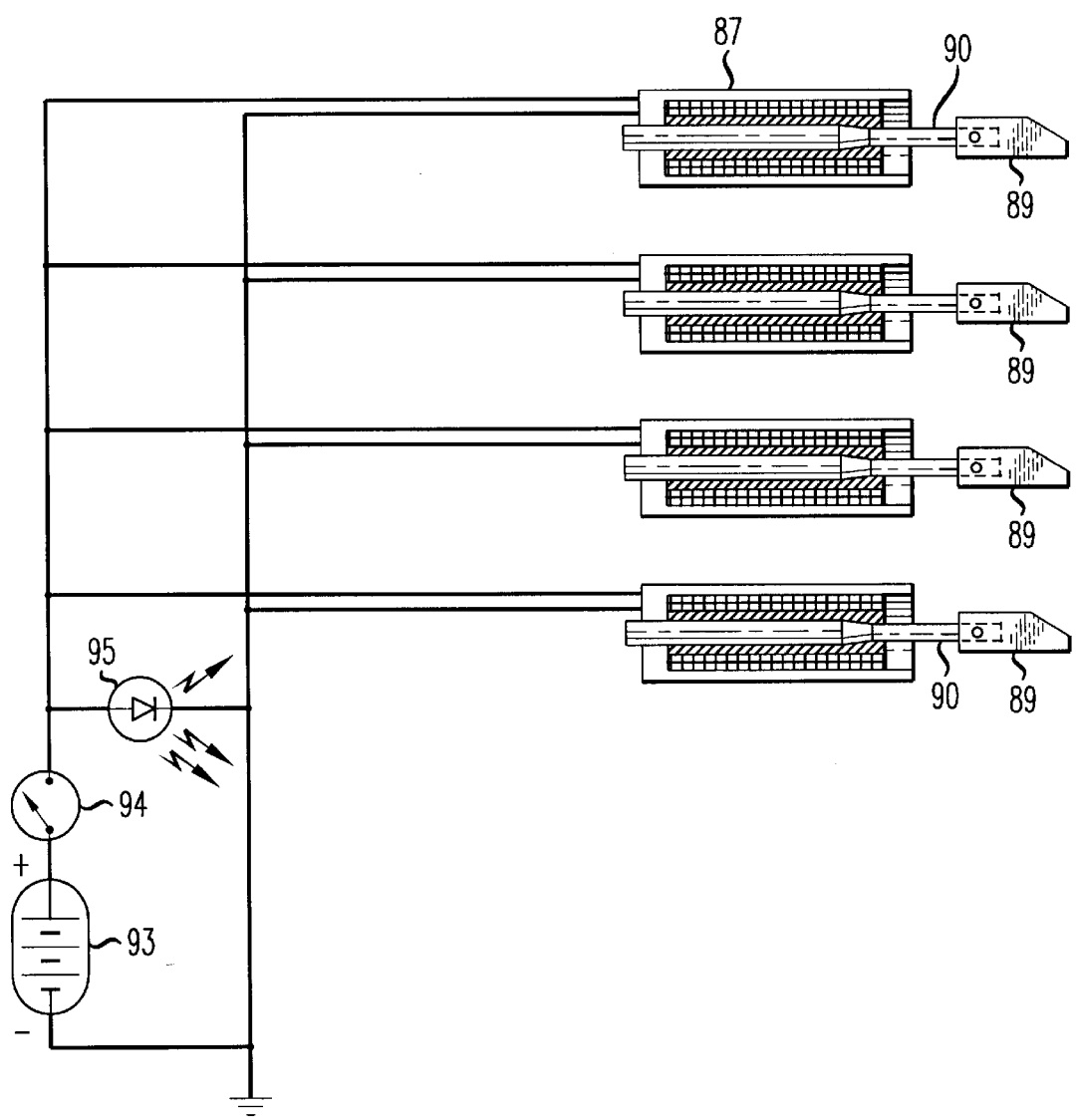
FIG. 17 is a schematic circuit, showing the four solenoids connected in parallel electrically, and the power supply capable of energizing the solenoids simultaneously, via a manual switch. The switch is shown in its closed position because the four plungers are shown extended.

Now referring to the linear tubular, push-type Solenoid 87, FIG. 16, a LEDEX part No. 195204-6-25 solenoid is used to depress end 91 of lever 88. Solenoid's plunger 90 has its end modified with added tapered attachment 89. Attachment 89 is rigidly adhered to plunger 90, and its end 89 is beveled to depress beveled end of lever 88, when extended, as shown in FIG. 16. FIG. 15 is the top view.

FIG. 16, latch or lever 88 is shown in two positions. The dashed line position is when the umbrella would be in its closed position. The solid-line position is when the umbrella would be in its open position, as shown in FIG. 14. When solenoid plunger 90 retracts to its solid line position, a coiled spring at the lever's pivot center 88' enables lever 88 to rotate to its solid line position. Power to solenoid 87 is off when plunger 90 retracts by spring return to its solid line position. Then the umbrellas are in their open positions. Coiled spring, not shown, at pivot shaft 88', keeps lever 88 in its solid-line position. Once the umbrellas are in their open positions, they would remain there until manually closed, after the aircraft lands. The umbrellas are available to provide retardation of aircraft descent, when needed, to avoid the aircraft from crashing.

Now referring again to circuit diagram FIG. 17, four solenoids 87, electrically connected in parallel, are shown. Power Supply 93 provides the voltage and current needed to energize four solenoids, via manual switch 94. The pilot closes Switch 94 when he needs the added lift provided by opened umbrellas 71, FIG. 12. LED 95 illuminates when switch 94 is closed, indicating to the pilot that the umbrellas have opened. Once opened, the umbrella cannot be automatically closed, while the aircraft is in flight. The umbrellas may be closed manually after the aircraft has landed. The umbrellas may be removed from the aircraft by simply removing pivot bolt 72, FIGS. 12 and 14. Canopy attached to ribs 85 of umbrella 71 cannot bend upwards by the wind, like an ordinary umbrella, because of twines 74 keeping ends of canopy down, FIGS. 12 and 14. The canopy is made of water proof, rip-resistant fabric.

Figure 19:
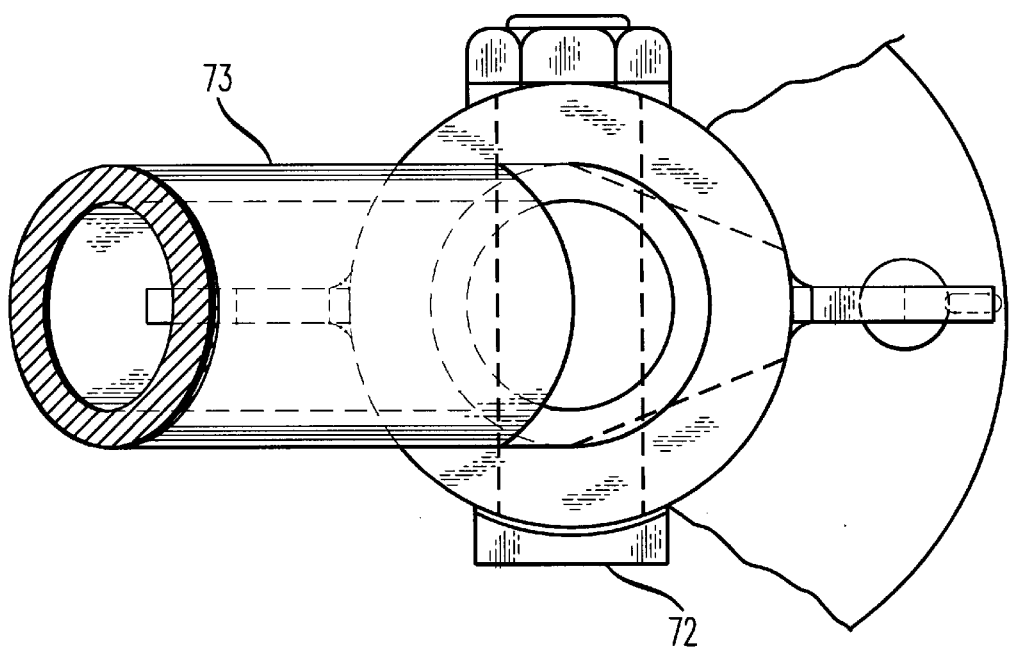
FIG. 19 shows the top view thereof, with tubular post sectionalized.
Figure 18:
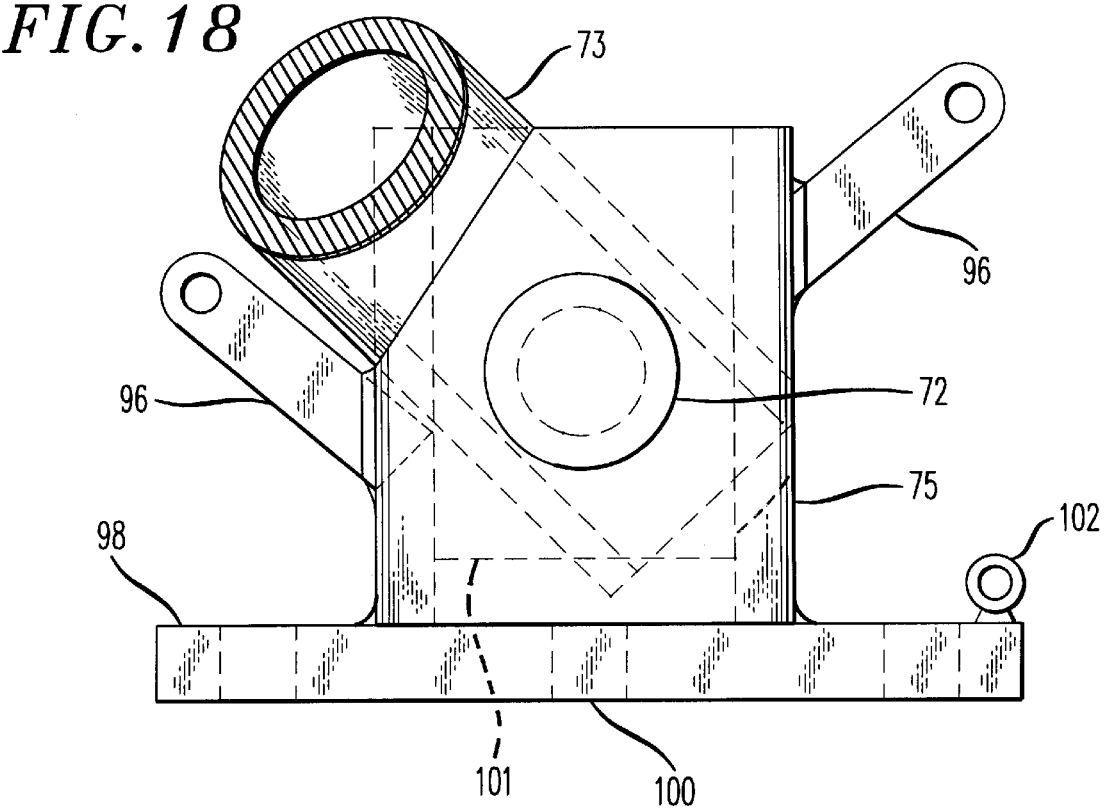
FIG. 18 shows a side view of a pivoted support for the umbrella of FIG. 14.

Umbrella post 73 sits inside of hollow cylindrical support 75, as shown in FIGS. 18 and 19. Attached to support 75 are projections 96 with eyelets for attaching umbrella support wires 74, to prevent the umbrella from being bent backward by the wind. The other end of wire 74 is attached to a rib 85. Rib 85 is for spreading out the canopy or fabric of the umbrella. Bolt 72, FIGS. 18 and 19, holds tubular post to hollow cylindrical support 75, pivotally. Holes 100 in base plate 98 enable support 75 to be attached to the aircraft frame. FIG. 18 is the side view of support 75, while FIG. 19 is its top view, with the lower portion of tubular post 73 attached swivably thereto. Dashed line 101 shows the position of tubular post 73, when it is in its vertical position. Numeral 102 has its lead line pointing to eyelet. The eyelet is for attachment of a coiled spring for keeping post 73 erect when aircraft is in motion. The addition of the coiled spring 99 is for helping keep post 73 erect and would be an optional accommodation for the umbrella lifting system.

In conclusion, the simplifying feature of the air craft's control system presented in this invention are the air valves enabling the transfer of the energy from the aircraft's forward motion to the energy of lifting one or more portions of the aircraft. No conduits, no energy from engines, no rockets, no jets are required. The energy needed to charge rechargeable batteries for operating the solenoids could come from solar panels mounted on the wings and fuselage of the aircraft.

I claim:

1. A light-weight aircraft with a fuselage, wings, belly and a lifting provision to provide roll axis control of the aircraft, when needed, to avoid a rolling over and a loss of control of said aircraft, said lifting provision including a rate-of-turn sensor, and a plurality of solenoid-operated air valves, each of said air valves having an inlet port and outlet port and a solenoid operator for selectively closing and opening said air valves, said air valves receiving their air from the atmosphere of said aircraft in flight by having each of their inlet ports facing the front of said aircraft, while having each of said outlet ports facing vertically down for selectively blasting out air to provide sufficient lift to the appropriate wing of said aircraft after the opening of a selected air valve by its associated solenoid operator; said lifting provision also including a first electrical control circuit, said electrical control circuit including a voltage supply, a remotely operated relay, coils of said solenoids and two manual switches, said remotely operated relay having its circuit closed by the output of a rate-of-turn sensor, the first of said two switches for by-passing said relay, the second of said two switches for opening the electrical circuit to make said lifting provision inoperative, said control system being identical for both wings of the aircraft, said air valves enabling the transfer of the energy from the aircraft's forward motion to the energy of lifting an aircraft's wing.

2. A lightweight aircraft in accordance with claim 1, wherein the coils of said solenoid-operated air valves are connected in parallel with said voltage supply, relay and said two manual switches.

3. A light weight aircraft in accordance with claim 1, and wherein said electrical control circuit includes a light-emitting diode (LED) connected in parallel with a solenoid coil to indicate and inform the aircraft pilot that said circuit has been activated.

4. A lightweight aircraft in accordance with claim 1, in which each of said air valves being a butterfly type valve having a disk within a pipe, said disk turning on an axis along its diameter within said pipe, each of said valves to rotate 90° by a solenoid actuator; to allow the air to flow through, with semi-circular resilient collars placed above and below said axis and adjacent to said disk and adhered to the inside wall of said pipe, to help avoid air leakage when said valves are in their closed position.

5. A lightweight aircraft in accordance with claim 1, in which said air valve has an elbow-shaped-solenoid-valve cage, with a plunger having a taper-shaped disk end to close onto a tapered mating seat; and to allow free passage of air when the valve is in its open position, said plunger portion of said cage forming a Y-shape when entering the body of said valve, so said air passing through the passageway of said valve being essentially unobstructed.

6. A lightweight aircraft in accordance with claim 1, wherein lifting for the entire aircraft may be needed to avoid said aircraft's crashing, and wherein said electrical control circuit for each wing being identical to each other and both circuits having a common third manual switch, a triple-pole, single throw, for by-passing each said relay, thus the pilot of said aircraft being able to bypass both of said manual switches, the first one of said two manual switches being for one wing and the other of said two switches being for the other wing's electrical control circuit, simultaneously, to actuate the air valves of both wings via said triple pole, single-throw manual switch, to enable a soft landing of said aircraft, instead of crashing at high speed.

7. A lightweight aircraft in accordance with claim 6, wherein the electrical control system for providing lifting for the nose portion of said aircraft is included in the lifting provision for the entire aircraft, the pilot of said aircraft being able to by-pass all three of the by-pass manual switches including the bypass switch for the pitch-axis control circuit, simultaneously, to actuate the valves of both wings and said nose, via a quadruple pole, single-throw manual switch, to enable a soft landing of said aircraft, instead of said aircraft crashing at high speed without said air valves blasting out high pressure air.

8. A lightweight aircraft with a fuselage, wings, a nose, a belly and with provision to provide the desired lifting to the nose portion of said aircraft, via solenoid air valves located under said nose, an electrical control circuit and a pitch-angle sensor, each of said solenoid air valves having an inlet port and outlet port and a solenoid operator for selective closing and opening said air valves, each of said air valves to receive high velocity air from the atmosphere of an aircraft during flight, each of said air valves having said inlet ports facing the front of said aircraft while having said outlet port facing vertically downward; during said opening of said air valves said air valves allowing air from said atmosphere entering into said inlet port to blast out of the outlet port for providing lift to the aircraft's nose; said electrical control circuit including a voltage supply, a relay remotely operated by said pitch angle sensor, the coil of solenoid operators and two manual switches, said relay having its circuit closed by sufficient output from. said pitch angle sensor, one of said two switches for short-circuiting the output of said relay, and said second switch for opening the electrical circuit to provide said lift provision inoperative, said air valves allowing the transfer of energy from the aircraft's forward motion to the energy of lifting said nose portion of said aircraft.

9. A lightweight aircraft with a fuselage, two wings, a belly and with a lifting provision to provide a desired lift to the two wings of said aircraft, said provision including a plurality of solenoid-operated air valves located under the wings wherein each wing having a combination of air valves, having inlets and outlets, some being supplied high pressure air by an air tank and other air valves receiving their high velocity air from the atmosphere when the aircraft is in flight, said outlets facing downward to provide lift and prevent excessive angular roll of said fuselage, said air tank supplying high pressure air to some of said valves via air ducts, said other valves receiving high velocity air from the atmosphere and requiring no air ducts, said tank to enable high air pressure to enter some of said air valves when said aircraft is flying at lower than predetermined speeds, when needed, to correct angular roll; and a first electrical control circuit and a roll-axis sensor for each wing's solenoid-operated air valves with coils receiving air from said air tank, and a second control circuit and a roll-axis sensor for said other valves without ducts connecting to said tank; each said control circuit for each wing including a voltage supply, a first relay, remotely-operated by said sensor, the coils of said solenoid-operated valves being connected in parallel with said voltage supply and two manual switches, a first and a second, said relay having its circuit closed by sufficient output voltage from said roll angle sensor, one of said two manual switches for by-passing said relay, the second switch for opening each electrical circuit to make said lift provision inoperative; a second relay in series with said first relay to close said first control circuit when the air velocity at the air inlets of said valves of said second control circuit receiving air at a lower than a predetermined velocity, in said valves' open position, said valves blasting out air vertically to provide lift to the appropriate aircraft's wing.

10. A lightweight aircraft in accordance with claim 9, and having a frame, wherein provision for retarding the descent of said aircraft being provided, said provision being a large foldable umbrella system, consisting of four or more large collapsible umbrellas selectively positioned at different appropriate locations atop said lightweight aircraft to provide added lift when needed, to retard the aircraft's rapid descent, wherein each of said umbrellas having two or more telescoping posts, one hollow lower post inserting into another upper hollow post, then a collar riding along the larger diameter post with ribs pivotally attached thereto, and additional pivotally attached ribs longitudinally placed inside the fabric of each of said umbrellas, as in the mechanism of existing foldable umbrellas, to enable opening and closing each of said umbrellas; the base of said lower post setting snugly inside a hollow, cylindrical support having a flat circular base plate with holes for bolt attachment to the frame of said aircraft; said lower post having a latch operated by a plunger-type solenoid for keeping closed each of said umbrellas, both said latch and said solenoid having spring returns, the plunger of said solenoid in an extended position when wanting said umbrellas to remain closed until said solenoid being de-energized by a manual switch, the lower part of said lower post being pivotable, being provided by a pivot bolt to allow said umbrella to move backward when said aircraft is moving forward to reduce excessive strain on said lower post, as well as on the ribs of said umbrellas, said ribs being made of flexible stainless steel to permit elastic bending under windy conditions; said plunger of said Solenoid retracting, when de-energized, to enable said latch to recess, in order to allow each of said umbrellas to open.

* * * * *